(12) United States Patent
Schwitters et al.

(10) Patent No.: US 9,327,705 B2
(45) Date of Patent: May 3, 2016

(54) METHOD AND DEVICE FOR STEERING A VEHICLE TOWARD AN OBJECT DURING A PARKING OPERATION

(75) Inventors: Frank Schwitters, Koenigslutter (DE); Philipp Hueger, Rühen (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 13/515,465

(22) PCT Filed: Nov. 11, 2010

(86) PCT No.: PCT/EP2010/006873
§ 371 (c)(1),
(2), (4) Date: Aug. 21, 2012

(87) PCT Pub. No.: WO2011/069589
PCT Pub. Date: Jun. 16, 2011

(65) Prior Publication Data
US 2012/0310459 A1 Dec. 6, 2012

(30) Foreign Application Priority Data

Dec. 12, 2009 (DE) .......................... 10 2009 058 139

(51) Int. Cl.
*B60W 10/06* (2006.01)
*B60W 10/02* (2006.01)
*B60W 10/08* (2006.01)
*B60W 10/10* (2012.01)
(Continued)

(52) U.S. Cl.
CPC .............. *B60W 10/06* (2013.01); *B60W 10/02* (2013.01); *B60W 10/08* (2013.01); *B60W 10/10* (2013.01); *B60W 10/184* (2013.01); *B62D 15/0285* (2013.01); *B60W 2550/142* (2013.01)

(58) Field of Classification Search
None
See application file for complete search history.

(56) References Cited

U.S. PATENT DOCUMENTS 5,864,285 A * 1/1999 Wieder et al. ................. 340/435
6,071,211 A * 6/2000 Liu et al. ....................... 477/175
(Continued)

FOREIGN PATENT DOCUMENTS

DE        41 42 580        6/1993
DE        196 07 788       9/1997
(Continued)

OTHER PUBLICATIONS

International Search Report, issued in corresponding International Application No. PCT/EP2010/006873.
(Continued)

*Primary Examiner* — Redhwan K Mawari
*Assistant Examiner* — Edward Torchinsky
(74) *Attorney, Agent, or Firm* — Kenyon & Kenyon LLP

(57) ABSTRACT

In a method and a device for steering a vehicle towards an object, an optimization of such steering leads to a close and accurate approach. In a method for controlling a vehicle having a drive unit and a braking device during a parking operation leading up to an object, the vehicle is brought to a parking speed up to a first distance of the vehicle from the object, the parking speed maximally corresponding to the drive speed that is achievable using the idling speed, the speed is maintained, and after the first distance has been reached, the braking device decelerates to standstill up to a second distance to the object, which corresponds to the stopping distance. Furthermore, a device is adapted for implementing the method.

12 Claims, 2 Drawing Sheets

(51) Int. Cl.
*B60W 10/184* (2012.01)
*B62D 15/02* (2006.01)

(56) References Cited

U.S. PATENT DOCUMENTS

| | | | |
|---|---|---|---|
| 6,226,593 | B1 | 5/2001 | Kurz et al. |
| 6,342,832 | B1 * | 1/2002 | Fuchs et al. .................... 340/436 |
| 6,634,984 | B1 * | 10/2003 | Doering et al. ............... 477/107 |
| 6,994,407 | B2 | 2/2006 | Kinder et al. |
| 7,719,410 | B2 * | 5/2010 | Labuhn et al. ................ 340/435 |
| 8,065,066 | B2 * | 11/2011 | Mori et al. ...................... 701/70 |
| 8,374,749 | B2 * | 2/2013 | Tanaka ............................ 701/41 |
| 2003/0151541 | A1 * | 8/2003 | Oswald et al. .................. 342/70 |
| 2003/0210173 | A1 * | 11/2003 | Schneider ....................... 342/70 |
| 2005/0131587 | A1 | 6/2005 | Takamatsu |
| 2008/0167781 | A1 * | 7/2008 | Labuhn et al. ................. 701/48 |
| 2009/0259365 | A1 * | 10/2009 | Rohlfs et al. ................... 701/41 |

FOREIGN PATENT DOCUMENTS

| | | | |
|---|---|---|---|
| DE | 100 63 062 | 6/2002 | |
| DE | 101 05 749 | 8/2002 | |
| DE | 10 2004 059 131 | 7/2005 | |
| DE | 10 2006 045 418 | 4/2008 | |
| EP | 1 018 458 | 7/2000 | |
| EP | 1 327 553 | 7/2003 | |
| EP | 1327553 A2 * | 7/2003 | ............. B60K 31/00 |
| GB | 2 262 491 | 6/1993 | |

OTHER PUBLICATIONS

German Search Report, issued in corresponding German Patent Application No. 10 2009 058 139.1.

Bosch Automotive Handbook, 22nd Edition, p. 472-473.

* cited by examiner

METHOD AND DEVICE FOR STEERING A VEHICLE TOWARD AN OBJECT DURING A PARKING OPERATION

FIELD OF THE INVENTION

The present invention relates to a method for controlling a vehicle's approach of an object and to a device for controlling a vehicle's approach of an object.

BACKGROUND INFORMATION

During a parking operation of a vehicle, especially an automatic parking operation, in which the driver determines the parking operation and the vehicle assumes the longitudinal and transverse control into the parking space, it is above all desirable that parking spaces whose length is difficult to estimate by the vehicle driver are able to be used for a parking operation. However, the parking system of the vehicle also determines the length of the parking space. This is the reason why a relatively large distance from an obstacle is selected during the measurement and subsequent parking operation, which makes it difficult if not impossible for the current systems to park in narrow parking spaces or to pull up close to an object while parking.

A control of the approach of an obstacle when driving in reverse is described, for example, in German Published Patent Application No. 196 07 788, in which the speed of the vehicle is held below a specified limit value in a first distance range from the obstacle, by influencing the engine output of the vehicle, and in a second distance range, the driving speed is restricted to a second limit value by generating a braking force in the wheel brakes.

SUMMARY

Example embodiments of the present invention provide for steering a vehicle toward an object in an even more precise manner.

When a vehicle approaches an object, the vehicle is operated at an idling speed of the drive unit, e.g., an internal combustion engine. Objects may be vehicles or also other obstacles, such as posts, curbs, trees, etc. Using the idling speed is especially advantageous since no intervention in the engine control is required for moving the vehicle. Example embodiments of the present invention may be used in a vehicle with an automatic transmission, since when a gear is engaged, the idling speed moves the vehicle at a low speed without further action by the driver. This approach of an object takes place up to a first distance range from the object, e.g., when driving up to the object in reverse. In example embodiments of the present invention, a sensor, such as an ultrasonic sensor in the rear region of a vehicle, detects the distance from an object.

The idling speed is described, for example, in the Bosch Automotive Handbook (22nd edition) and is defined in that sensors determine the engine speed, engine temperature and throttle valve position. Furthermore, load states of an automatic transmission, a climate control system, a power steering system, for example, and other interference quantities are detectable as well. These factors are used for regulating the idling speed. If the vehicle is operated at idling speed and a consumer is connected, this causes virtually no drastic drop in the speed and may be absorbed by the idling speed.

According to example embodiments of the present invention, the transmission of the engine output to the wheels is interrupted until a second distance to the object has been reached, which is less than the first distance to the object and whose end is determined by at least one sensor and at least one control device. In example embodiments of the present invention, this reaching of the first distance to the object, at which the force transmission is interrupted, also depends on the angle of inclination of the vehicle and the movement direction of the vehicle in the direction of, or counter to, an inclination. Conventional sensors, such as wheel speed sensors and/or gear position sensors and/or tilt sensors etc., may transmit these parameters to the control device. Using the speed of the vehicle while idling and the mentioned environmental and sensor information, the control device during the approach determines the first distance to the obstacle at which braking is initiated and the transmission of force from the engine to the wheels is interrupted.

It may be provided that after the first distance to the object has been reached, the braking device decelerates to standstill by the time a second distance to the object, which corresponds to the stopping distance, has been reached. It is furthermore considered advantageous that a control signal is generated when the braking device is actuated, in order to open at least one clutch for the transmission of force from the drive unit to at least one wheel, by an actuator.

It may be provided that during the idling operation of the vehicle, the clutch, e.g., the transmission clutch for first gear or the lowest gear ratio, such as for reverse gear, is not closed completely. This sliding of the clutch further reduces the speed of the vehicle for the approach of the object, to approximately, e.g., 1 km/h to 5 km/h, preferably 3 km/h, which is considered advantageous for the precise approach of an object.

The control device may control at least one brake actuator in order to achieve active braking to standstill in front of an obstacle. For one, this has the advantage that the standstill at an obstacle is precisely controlled and, for another, that the vehicle is kept in this position at standstill, in particular in that the functionality of the electric parking brake is active or becomes active once standstill has been reached.

It is considered advantageous that when another object such as a ball, for example, enters the approach trajectory between the vehicle engaged in parking and the actual object, immediate active braking is possible to ensure that the vehicle comes to a standstill already in front of this additional object. The further object is immediately detected by at least one sensor, e.g., the ultrasonic sensor, and transmitted to the computing device, which activates the braking operation directly.

The stopping distance from the object at which parking is to take place, for example, depends on a parking space that has been measured by the vehicle beforehand while passing the space, provided a longitudinal or transverse space is involved. After passing by, the vehicle driver receives the signal that parking is possible. The parking operation into the parking space begins with the operation of an operating element.

The movement of the vehicle toward the object at idling speed until a first distance to the object has been reached results in a low speed, which is considered advantageous for a precise approach of the object. By decoupling the drive unit and initiating the braking operation, the speed is further reduced to standstill in an effort to achieve an exact stopping distance from the obstacle. A low speed allows an exact evaluation of the sensor signals and precise braking to standstill. The control of at least one brake of the vehicle, for example, may be implemented via an electronic brake control, such as a, e.g., conventional, ESP program (Electronic Stability Program), for example.

An idling operation in the case of a vehicle with automatic transmission means, for instance, that when a gear is engaged, such as "R" for reverse driving" or "D" for driving, the vehicle moves without the driver activating the brake and/or the accelerator, in other words, the driver does not influence the longitudinal guidance of the vehicle. Example embodiments of the present invention do not require an intervention in the engine control for an idling operation. The idling operation uses the idling speed of the engine, which is selected so as to prevent the engine from shutting down and to ensure that the vehicle continues moving. The idling speed lies in a range of, e.g., approx. 800 rpm to approx. 1500 rpm. If the vehicle uses an electric motor for its approach of an obstacle, then idling speed refers to the range at which the vehicle with automatic transmission moves within a speed range of, e.g., approx. 1 km/h to 10 km/h, without the vehicle driver actively intervening in the longitudinal guidance.

In a vehicle with automatic transmission, it is considered particularly advantageous that when an object is approached, e.g., a move into a parking space takes place, the gear selection for the change in direction for multiple back-and-forth maneuvers is initiated via at least one control device and at least one actuator, so that automatic parking is possible without intervention on the part of the driver. In other words, the gear changes are automatic.

In a vehicle with manual transmission, the vehicle is moved forward in first gear at idling speed or backwards in reverse gear, without the vehicle driver actively operating the brake pedal and/or accelerator. Once a first distance to the obstacle has been reached, the clutch is opened for a force transmission with the aid of an actuator, which is controlled according to example embodiments of the present invention. Instead of controlling the actuator, the vehicle driver may receive information of an optical and/or acoustic nature, which signals him to operate the clutch. Here, too, example embodiments of the present invention allow an especially energy-saving use of the vehicle by utilizing the idling speed, and an exact approach of the obstacle until standstill by a low speed. As an alternative, the actuator may be adapted to allow sliding of the clutch in this case, as well.

In the approach of an object on an incline, e.g., on a hill road, that is to say, when the vehicle must approach the object counter to the incline, an intervention in the engine control may take place only when starting from standstill, so as to briefly accelerate the vehicle prior to the idling operation.

According to example embodiments of the present invention, the approach of an object may be initiated by actuating an operating element and/or by voice operation.

In a device for steering a vehicle close to an object, a drive unit moves the vehicle, a braking device decelerates the vehicle, at least one sensor detects the distance from the object, and at least one control device records the data, analyzes the data and outputs appropriate control signals. With the aid of the drive unit, the device according to example embodiments of the present invention brings the vehicle up to a speed which maximally corresponds to the drive speed at idling speed. The drive unit maintains the speed up to a first distance to the object, and the braking device decelerates the vehicle to standstill up to a second distance to the object, which corresponds to the stopping distance.

Furthermore, it is considered advantageous to use example embodiments of the present invention for hybrid and/or electric vehicles. When using an electric drive in the operation, it is considered advantageous that the electric motor implements generator-based braking and that the obtained energy is regenerated, i.e., returned to the battery. In this configuration, no opening of the clutch would take place.

Example embodiments of the present invention are explained in greater detail with reference to the appended Figures.

DETAILED DESCRIPTION

Figure 1:
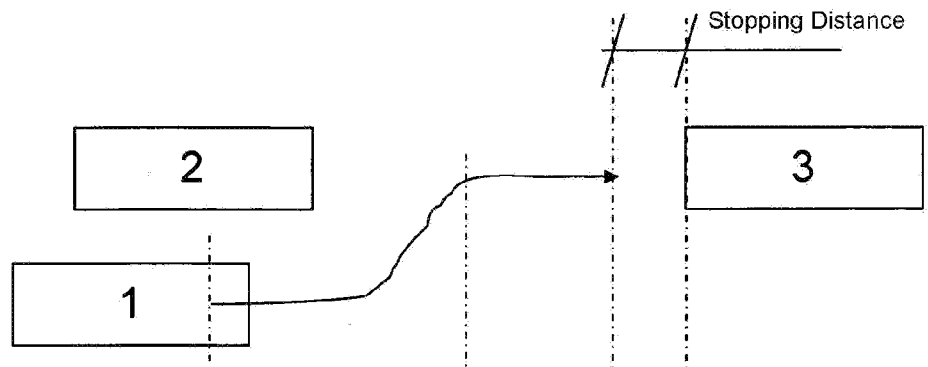
FIGS. 1 to 3 illustrate an exemplary parking operation.

FIG. 1 shows an exemplary parking operation according to an example embodiment of the present invention. When driving past objects 2 and 3, vehicle 1 records the parking space between these two objects 2 and 3 with the aid of laterally oriented ultrasonic sensors, and signals to the driver of vehicle 1 that a parking operation is possible. Based on the determined data, a parking trajectory is calculated in a control device. When vehicle 1 has reached standstill, the vehicle driver actuates an operating element to initiate the parking operation. He is then asked, e.g., via a display device, to shift into reverse, in this case, to parking lever position "R" for reverse driving for an automatic transmission, and to disengage the brake. Using the idling speed of the engine, the vehicle moves toward object 3 along the calculated trajectory up to a first distance to the object. The transverse guidance takes place automatically via control of the electromechanical steering system of vehicle 1. The rear sensors of vehicle 1, which are also not shown here and which may also be ultrasonic sensors, determine the distance to object 3. Starting at the first distance to the obstacle calculated in the control device (up to the second distance to the object), a signal is transmitted to the actuator in the automatic transmission, whereupon the actuator opens the clutch and interrupts the torque transmission of the engine to the wheels. The control device transmits at least one signal to the brake actuator, e.g., the ESP brake of at least one wheel, and initiates braking. Using the information from the rear sensors and, for example, a stopping distance stored in control device 6, the brake force required to achieve precisely this second distance to the object is calculated. This calculation is performed inside the control device that controls the signals for the braking operation.

Figure 2:
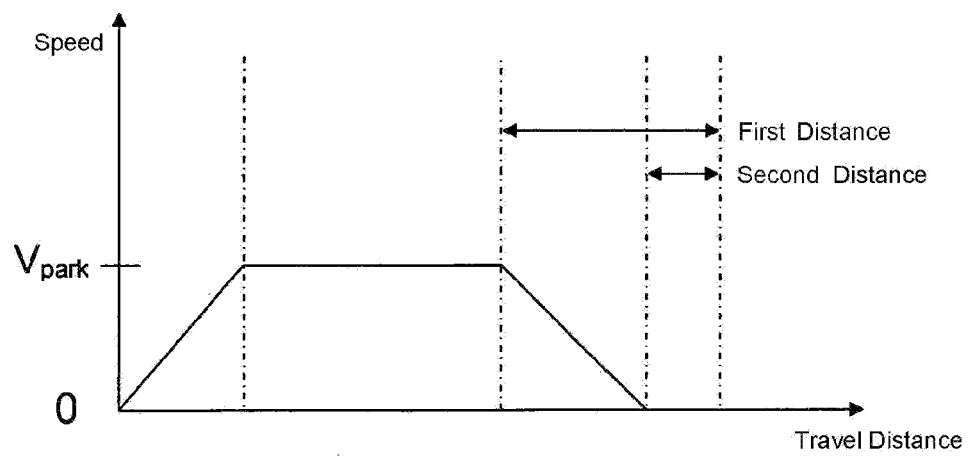

FIG. 2 illustrates the speed of the vehicle across the distance of the parking operation shown in FIG. 1 for example. The vehicle is briefly accelerated from standstill after the vehicle driver has engaged the reverse gear in the automatic transmission and has disengaged the brake. The vehicle speed rises to the speed that enables the idling speed. The clutch slides at idling speed, so that driving takes place at a low speed of 3 km/h, for example. The speed is maintained until the first distance to the object has been reached. Upon reaching the first distance to the object, the clutch is opened and the vehicle speed is decelerated to standstill by the time the second distance to the object, which corresponds to the stopping distance, has been reached.

Figure 3:
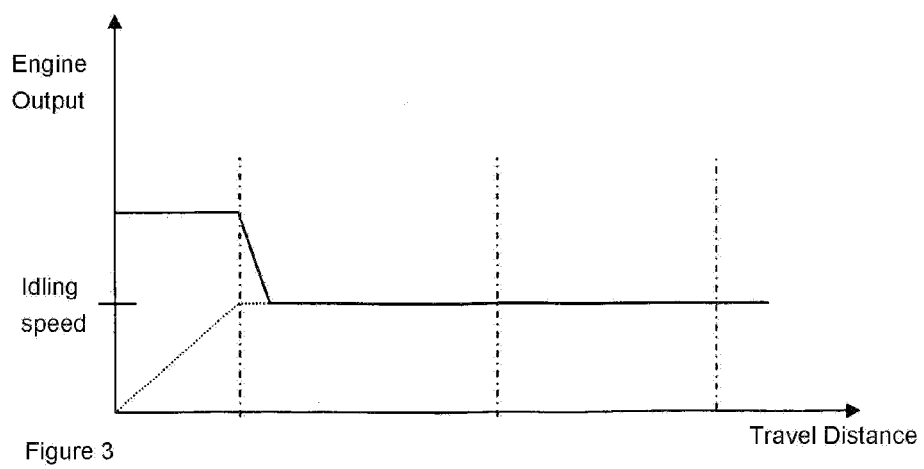

FIG. 3 exemplarily illustrates the characteristic of the engine output across the length of travel when the vehicle must be moved counter to a slope. The engine output is briefly increased in order to improve the power-takeoff of the vehicle. The engine speed of the motor is briefly higher than the idling speed in this case. After power-takeoff, the engine output is reduced and the vehicle is operated at idling speed. The increase depends on the measured distance from the obstacle and the determined gradient as well as vehicle characteristics such as the weight, the tires, etc. A calculation is undertaken in control device 6 to determine at which distance from object 3 the engine output will be reduced in order to then move the vehicle at idling speed. Utilizing the mentioned information, it is also calculated at which point the first distance has been reached, i.e., the clutch will be opened. This distance may be corrected based on continuous information to the control device of the at least one rear sensor. As illustrated in FIG. 3, the idling speed remains approximately constant after the first distance has been reached, i.e., after the torque transmission has been interrupted by opening the clutch.

Figure 4:
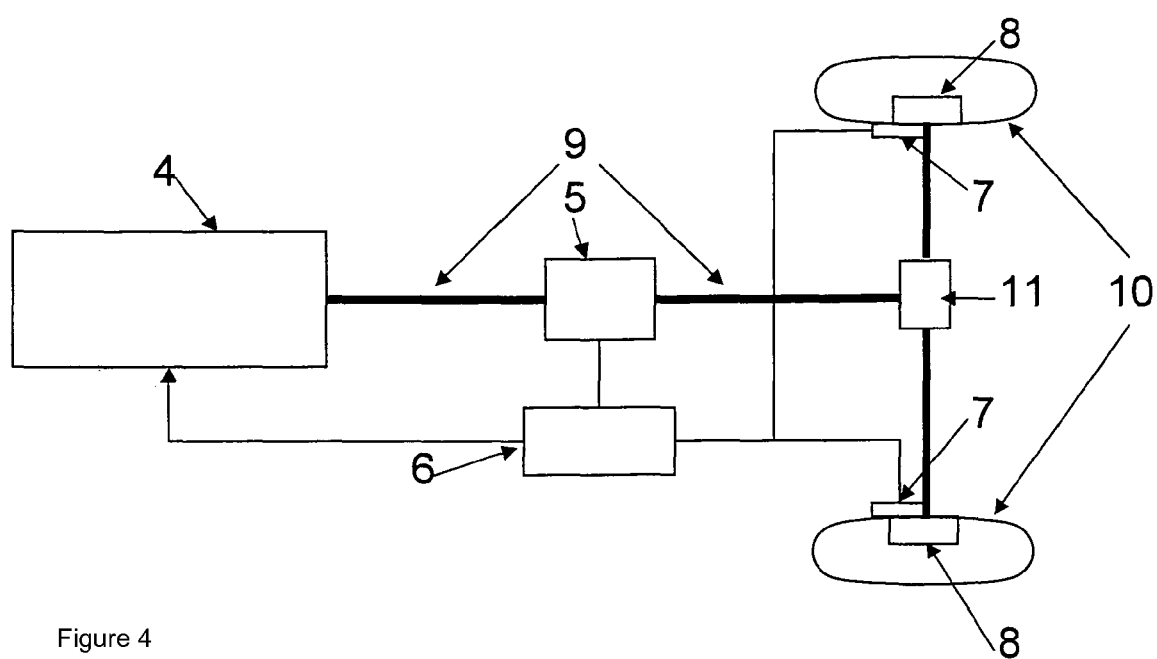
FIG. 4 schematically illustrates the structure of a device according to an example embodiment of the present invention.

FIG. 4, for example, shows the device having an engine 4 and an engine control device, which is not shown here. The engine in this case is an internal combustion engine. The output of engine 4 is transmitted to an automatic transmission 5 by a drive shaft 9, and the transmission outputs the requested power to wheels 10 via differential 11. An advantageous control device 6 for the parking operation is connected to the engine control device, the brake actuator having control unit 7, and to automatic transmission 5, and is able to transmit and receive signals. The at least one sensor for determining the distance to a rear object is also not shown in FIG. 4. The at least one sensor also supplies information to control device 6, which is a computing device, for example. Control device 6 receives a signal from the vehicle driver, to the effect that the vehicle is to approach an object. The vehicle begins driving when the reverse gear is engaged and the brake disengaged, engine 4 being operated at the idling speed. The control device transmits a signal to transmission control unit 5, so that at least one clutch in transmission 5 is not closed completely and the vehicle moves at idling speed, at, e.g., approximately 3 km/h. If the at least one sensor detects the object, it transmits a corresponding signal, and control device 6 determines the first distance to the object, up to which an approach to the object is made using the idling speed. When the first distance has been reached, corresponding signals are transmitted to brake actuator 7 in order to initiate the braking operation at at least one brake device 8. At the same time, signals are sent to automatic transmission 5 to open the clutch, so that no further force of motor 4 is transmitted to wheels 10. Braking takes place such that the exact stopping distance from the object, which is stored in control device 6, is achieved. Due to the fact that the at least one sensor transmits the information to control device 6, it is possible to calculate the braking force for achieving the exact stopping distance from the object.

LIST OF REFERENCE NUMERALS

1 a vehicle, which is engaged in a parking operation
2. parked vehicle
3 object
4 engine having an engine control device (drive unit)
5 automatic transmission having a clutch and control device
6 control device
7 brake actuator having a control device
8 brake device
9 drive transmission device
10 wheel
11 differential gear

What is claimed is:

1. A method for controlling a vehicle, equipped with a drive unit and a brake device, during a parking operation next to an object, comprising:
   detecting a distance to the object;
   detecting an angle of inclination of the vehicle;
   detecting a movement direction of the vehicle relative to the angle of inclination;
   determining a first distance of the vehicle from the object as a function of the detected angle of inclination and the detected movement direction;
   accelerating the vehicle from a stand still by the drive unit bringing a speed of the vehicle to a parking speed up to the first distance of the vehicle from the object, the parking speed maximally corresponding to a drive speed achievable with an idle speed of the drive unit;
   maintaining the speed automatically by the drive unit; and
   after reaching the first distance and before attaining a second distance to the object, corresponding to a stopping distance, decelerating the vehicle to a standstill by the brake device;
   wherein the vehicle is moved up to the first distance to the object using the idle speed of the drive unit and an approximately closed clutch for force transmission, and after the first distance has been reached, the clutch is opened until the second distance has been reached.

2. The method according to claim 1, wherein the clutch is closed nearly completely or opened.

3. The method according to claim 1, wherein the idle speed of at least one motor of the drive unit is between 600 and 1500 rpm.

4. The method according to claim 1, wherein the idle speed of at least one motor of the drive unit is approximately 800 rpm.

5. The method according to claim 1, wherein the drive unit includes at least one electric motor.

6. The method according to claim 1, wherein the clutch is opened when the brake device is actuated.

7. The method according to claim 1, further comprising:
   calculating a brake force of the brake device to attain the stopping distance; and
   decelerating the vehicle to the standstill based on the calculated brake force.

8. The method according to claim 1, further comprising:
   detecting an additional object in the approach trajectory of the vehicle;
   detecting a distance to the additional object; and
   decelerating the vehicle to a standstill by the brake device before the distance to the additional object.

9. A device for controlling a vehicle during a parking operation leading up to an object, comprising:
   at least one sensor configured to detect a distance to the object;
   at least one sensor configured to detect an angle of inclination of the vehicle;
   at least one sensor configured to detect a movement direction of the vehicle relative to the angle of inclination;
   a drive unit configured to accelerate the vehicle from a stand still to bring the vehicle to a speed that maximally corresponds to a drive speed at an idle speed of the drive unit, and to automatically maintain the speed until the first distance to the object is reached;
   a brake device is configured to decelerate the vehicle to a standstill up to a second distance from the object that corresponds to a stopping distance; and
   at least one control device configured to determine a first distance of the vehicle from the object as a function of the detected angle of inclination and the detected movement direction;
   wherein the vehicle is moved up to the first distance to the object using the idle speed of the drive unit and an approximately closed clutch for force transmission, and after the first distance has been reached, the clutch is opened until the second distance has been reached.

10. The device according to claim 9, wherein the drive unit includes an electric motor.

11. The device according to claim 9, wherein the at least one control device is further configured to calculate a brake force of the brake device to attain the stopping distance, and the brake device is further configured to decelerate the vehicle to the standstill based on the calculated brake force.

12. The device according to claim 9, further comprising:
    at least one sensor configured to detect an additional object in the approach trajectory of the vehicle; and
    at least one sensor configured to detect a distance to the additional object;
    wherein the at least one brake device is further configured to decelerate the vehicle to a standstill before the distance to the additional object.

* * * * *